(12) United States Patent
Cole et al.

(10) Patent No.: US 6,578,319 B1
(45) Date of Patent: Jun. 17, 2003

(54) HYDROPONIC GROWING ENCLOSURE AND METHOD FOR THE FABRICATION OF ANIMAL FEED GRASS FROM SEED

(76) Inventors: Robert Cole, 723 Meloche, Montreal, Quebec H9P 2S4 (CA); Douglas Lloyd, 158 Hillcrest Ave., Lachine, Que (CA), H8R 1JA ( * ) Notice: Subject to any disclaimer, the term of this patent is extended or adjusted under 35 U.S.C. 154(b) by 0 days.

(21) Appl. No.: 10/000,441

(22) Filed: Dec. 4, 2001

(51) Int. Cl.$^7$ .............................................. A01G 31/00
(52) U.S. Cl. .................. 47/61; 47/17; 47/59; 47/62 R; 47/60
(58) Field of Search ...................... 47/17, 58.1, DIG. 6, 47/14, 59, 60, 61, 62 R, 62 N, 63, 64, 62 A, 62 C (56) References Cited

U.S. PATENT DOCUMENTS

| | | | | |
|---|---|---|---|---|
| 2,928,211 A | * | 3/1960 | Martin | |
| 3,458,951 A | * | 8/1969 | Martin | |
| 3,807,088 A | * | 4/1974 | Jones | 47/1.2 |
| 4,068,405 A | * | 1/1978 | Campbell et al. | 47/65 |
| 4,163,342 A | * | 8/1979 | Fogg et al. | 47/58 |
| 4,170,844 A | * | 10/1979 | Steele | 47/62 |
| 4,255,897 A | * | 3/1981 | Ruthner | 47/65 |
| 4,258,501 A | * | 3/1981 | Brown | 47/16 |
| 4,356,664 A | * | 11/1982 | Ruthner | 47/65 |
| 5,073,401 A | * | 12/1991 | Mohr | 426/658 |
| 5,493,808 A | * | 2/1996 | Munday | 47/60 |
| 6,055,771 A | * | 5/2000 | Warnacut | 47/58.1 |
| 6,295,759 B1 | * | 10/2001 | Malone et al. | 47/62 |

FOREIGN PATENT DOCUMENTS

| | | | | |
|---|---|---|---|---|
| FR | 2595196 | * | 9/1987 | A01G/31/06 |
| GB | 2030833 A | * | 10/1978 | A01G/31/02 |
| GB | 2030834 A | * | 10/1978 | A01G/31/02 |
| GB | 2030835 A | * | 10/1978 | A01G/3/02 |
| GB | 2121263 A | * | 6/1983 | A01G/31/02 |
| GB | 2206271 A | * | 1/1989 | A01G/31/02 |
| GB | 2234147 A | * | 1/1991 | A01G/31/00 |

* cited by examiner

Primary Examiner—Michael J. Carone
Assistant Examiner—Andrea Valenti
(74) Attorney, Agent, or Firm—Ogilvy Renault; Guy Houle (57) ABSTRACT

A self-contained hydroponic growing enclosure and method for the fabrication of animal feed grass from seed is described. The enclosure is a self-contained enclosure which is insulated and which can be transported or assembled on site and which is independent of outside climatic conditions. Seed is stored in an isolated portion of the enclosure and fed to germination tanks in predetermined quantities where the seeds are germinated for a predetermined period of time. The tanks are then drained of their iodine-treated water and the germinated seeds are placed in predetermined quantities onto trays which are placed at an inlet end of a racking system. Trays are removed with grown grass at a harvest outlet end of the racking system in the same sequence as they are placed at the inlet end, so that there is a continuous daily supply of feed grass. Light walls are provided on opposed sides of the racking system to illuminate the beds. Conditioned air is also convected through the racking system from the inlet end to the outlet harvest end and the air flow distributes carbon dioxide generated in an inlet end section by the germinating seed grain, over the entire growing beds. The beds are also sprayed with water and the air flow is reconditioned by an air conditioning unit, filtered to remove bacteria and recirculated through the racking system. More specifically, the production system uses feed-quality barley for growing in tray beds to produce approximately 2,200 pounds of feed grass per day in a 7-day cycle from seed to feed.

20 Claims, 7 Drawing Sheets

HYDROPONIC GROWING ENCLOSURE AND METHOD FOR THE FABRICATION OF ANIMAL FEED GRASS FROM SEED

TECHNICAL FIELD

The present invention relates to a hydroponic growing system and particularly to a fully integrated hydroponic process and apparatus which utilizes a universally available, feed-quality barley seed or other suitable seed to produce a young barley grass product for animal feed.

BACKGROUND ART

Hydroponics is the art of growing plants without soil and has been practised for many years. Hydroponic systems for growing grain and legume seed to a sprouted grass crop in a controlled environment has been practised in over 10 known applications over the last 40 years. The commercial success of these systems has been limited, though it has been clearly demonstrated that high-quality plants can be produced in a very short period of time using a controlled hydroponic system.

Generally, controlled hydroponic systems for this type of application consists of a controlled environmental enclosure in which the grain is germinated and grown on either racked trays or a moving mat type system. Most of these applications included some type of air conditioning and distribution system, a water supply and irrigation system and a controlled artificial or solar light source.

In U.S. Pat. No. 2,928,211 to I. Z. Martin, issued Mar. 15, 1960 and titled "Hydroponic Apparatus," there is described a cabinet with a structure for supporting trays inside the cabinet. Water and nutrients are supplied to the trays through a spray system. An array of fluorescent lights illuminate the growing plant material in the trays. An air handling system includes a heat pump and heat exchanger with thermostatic controls and blowers.

U.S. Pat. No. 3,458,951 to I. Z. Martin, issued Aug. 5, 1969 and titled "Hydroponic Grass Unit," describes a larger controlled environmental chamber for use on farms as a barley grass production chamber. The inside chamber is insulated and temperature, humidity, light, ventilation and irrigation are carefully controlled. The growing trays are in a fixed slopped rack to promote drainage toward the rear of the enclosure.

U.S. Pat. No. 3,807,088, issued Apr. 30, 1974 and titled "Controlled Environmental Hydroponic System," shows a translucent building in which plants are arranged in longitudinally extended growing beds. The temperature and humidity within the building is controlled with a spray apparatus utilized to apply a fine mist over the growing plants when the sunlight becomes excessively intense.

U.S. Pat. No. 3,284,948, titled "Continuous Hydroponic System," describes a system of operation in a controlled atmosphere which includes multi-layered, flexible open-mesh belts which serve as continuous growing beds. A seed hopper deposits grain in a uniform depth onto the moving belt. The seed is watered as the belt slowly moves from the seed input to the harvest side where the plant roots are stripped from the belt for use as feed.

U.S. Pat. No. 4,068,405 to Campbell et al, titled "Automatic Plant Food Production," describes a controlled environment for growing plants. The enclosure has a plurality of artificial lights positioned over the growing region. Planting trays are mounted for automatic or controlled movement past the light sources, then to a work area for planting, cultivating, crop management and harvesting.

U.S. Pat. No. 5,073,401 to L. D. Mohr, titled "Automatic Hydroponic Growing System," describes a sheet seed structure primarily for use in hydroponic systems. This pre-manufactured seed sheet is a substrate of biodegradable and digestible material such as cellulose and contains sterilized seed charged with a biologically active material. Pre-cut sheet is removed from a package and placed in a controlled growing chamber.

The U.S. Pat. No. 3,458,951 aforementioned was one of the first applications of a hydroponic barley grass factory designed as a walk-in plant capable of producing 2,000 pounds of seven day old barley grass per day.

Most of the known systems were plagued by either equipment failure, bacterial growth and/or material failure. A combination of these led to high maintenance and frequent system crashing. Most of these systems failed in a matter of months for one or a combination of the following:

Material Failure—The constant subjection of high humidity, air movement, intense lighting, heat generation from the growing beds and the use of chlorine and nutrients affected the application of many materials. Generally, operational failures occurred in a variety of coated carbon steels, aluminum alloys and elastomers. These failures occurred in walls and floors, particularly around joints and seams, in the growing trays and racking system, in the air ducting system, and particularly with the use of any mechanical apparatus in the growing chamber. The first units were applications of a slow-moving conveyor belt bed that took 7 days to move the 20 or 30 feet to harvest. Motors and chains were impossible to maintain in such a constant intense environment.

Germination—Most of these units gave no consideration to seed germination. The seed was either metered onto a belt or scooped directly into trays, where it germinated and grew over a 7-day cycle. In order to insure a high germination rate and high barley grass yield, a "seed-quality" barley had to be used for feed stock instead of the more globally available "feed-quality" seed. This led to production inefficiencies which were not acceptable in most agricultural applications.

Nutrients and Chlorine—Because most prior applications had no germination apparatus, nutrients were used to boost early-stage growth in order to achieve the sevenfold weight gain in 7 days as achieved without nutrients under ideal laboratory conditions. A combination of subsystem failures often brought on the rapid fungal growth in the chamber. Chlorine was introduced into several of these operating systems, creating other problems to the overall system operation.

Lighting—In order to intensity the operations of most systems, the growing beds were stacked and the lighting source was mounted in the walls on one or both sides of the chamber in order to illuminate all growing levels. The standard use of fluorescent tubes with ballasts or other bulbs with ballasts caused maintenance problems because of the difficult access to the walls behind the layered racking system. Sealing and resealing against moisture was a severe problem associated with most applications. Some units have employed a passive solar wall to avoid electrical expense and associated maintenance problems. These gains are lost in production control and output.

Air Handling and Treatment—Most of the prior are applications relied on standard packaged, externally mounted HVAC units to control the growing chamber temperature. Unfortunately, these units were designed for supplying heated or cooled air on demand, and not the high humidity inherent in growing rooms designed for applications in extreme external conditions. Many failures also occurred because of wrong material selection for internal air ducting equipment. Different types of heat exchangers and humidity control devices have been tried with the inherent loss of overall process control. Some systems have added carbon dioxide to the air flow in order to increase production.

Water Filtration and Treatment—Most of the prior art makes little or no mention of a comprehensive water management system. Of course, most of the system operational balance depends on a water source free from bacteria which could later cause and aggravate fungal and mold problems.

High production growing rooms demand continual operation, with a low daily operational time to harvest and seed and limited maintenance time.

SUMMARY OF INVENTION

It is a feature of the present invention to provide a self-contained hydroponic growing enclosure for the fabrication of animal feed grass and which substantially overcomes the disadvantages of the above-mentioned prior art.

Another feature of the present invention is to provide a method of hydroponic growing animal feed grass in an out-of-doors enclosure and independent of outside climatic conditions.

Another feature of the present invention is to provide a self-contained hydroponic growing enclosure which is modular in concept and designed for factory or field assembly by simple mechanical tools.

Another feature of the present invention is to provide a self-contained hydroponic growing enclosure having a racking system which utilizes a gravity feed roller system for displacing the feed trays on a daily basis and which is easy to use for loading or unloading.

Another feature of the present invention is to provide a self-contained hydroponic growing enclosure wherein the water feed system, as well as the air handling system and feed germination system, are automatically controlled.

According to the above features, from a broad aspect, the present invention provides a self-contained hydroponic growing enclosure for the fabrication of animal feed grass from seed and independent of outside climatic conditions. The growing enclosure comprises a seed grain storage means located in a control compartment section of the enclosure and isolated from a growing and harvest compartment section. Conveyor means is provided to supply seeds from the storage means to a germination tank located in the growing and harvest compartment. The germination tank has bacteria-suppressing means. A racking system is provided in the growing and harvest compartment to support a plurality of trays of germinating seed grain and growing grasses in horizontally spaced-apart growing beds. The racking system has an inlet end where the grass seeds are germinating and an outlet harvest end where the grass seeds have developed to the prerequisite grass size. Light wall units are provided on opposed sides of the racking system and dimensioned to provide light over all of the seed beds. An air handling and conditioning system having directional air outlet means is provided for circulating a continuous conditioned and filtered air flow across all of the trays in the racking system from the inlet end to the outlet harvest end. The air flow distributes carbon dioxide, generated in a section of the inlet end by the germinating seed grain, over the entire growing beds. Water supply conduit means is associated with the enclosure to connect with a pressurized water supply source. Spray means is provided to spray water over the beds. The light wall units each have a light-diffusing wall enclosure provided with light-reflecting means and an independent light housing for housing light sources and associated electrical parts. The light-reflecting means provides substantially uniform light radiation along the racking system and over the beds.

According to a further broad aspect of the present invention, there is provided a method of hydroponic growing animal feed grass in an out-of-doors enclosure and independent of outside climatic conditions. The method comprises the steps of:

(i) feeding a predetermined quantity of seed grain from a storage means to a germination tank having iodine-treated water;

(ii) germinating said seeds for a predetermined period of time;

(iii) placing a predetermined quantity of germinated seeds in a predetermined number of grass-growing trays at an inlet end of a racking system;

(iv) radiating light over beds of said trays supported in said racking system;

(v) circulating a continuous conditioned and filtered air flow across all of said trays supported in said racking system from said inlet end to an outlet harvest end; said air flow distributing carbon dioxide generated in a section of said inlet end by said germinating seed grass, over said entire growing beds; and (vi) removing a predetermined quantity of trays of grown feed grass from said harvesting end to make room in said racking system to place the trays of step (iii).

BRIEF DESCRIPTION OF DRAWINGS

A preferred embodiment of the present invention will now be described with reference to the example thereof as illustrated in the accompanying drawings, in which.

DESCRIPTION OF PREFERRED EMBODIMENTS

Referring to the drawings, and more particularly to FIGS. 1 to 7, there is shown the self-contained hydroponic growing enclosure 10 of the present invention. The enclosure is fabricated from stainless steel, or at least has its inner sheeting 11 made from stainless steel, and an outer wall sheeting 12. An insulating material 13 is disposed between the sheetings 11 and 12, whereby the enclosure can be temperature-controlled to fabricate animal feed grass from seed and independent of outside climatic conditions. The enclosure may be of a trailer type or mounted on a flat bed and disposed on site, with the operational equipment therein assembled on site by the use of conventional tools.

As shown more clearly in FIGS. 1 to 4, the growing enclosure comprises a control compartment section 14, which is isolated from a growing and harvest compartment section 15 by a separator wall 16, the outer surfaces thereof being covered with stainless-steel sheeting.

Figure 15:
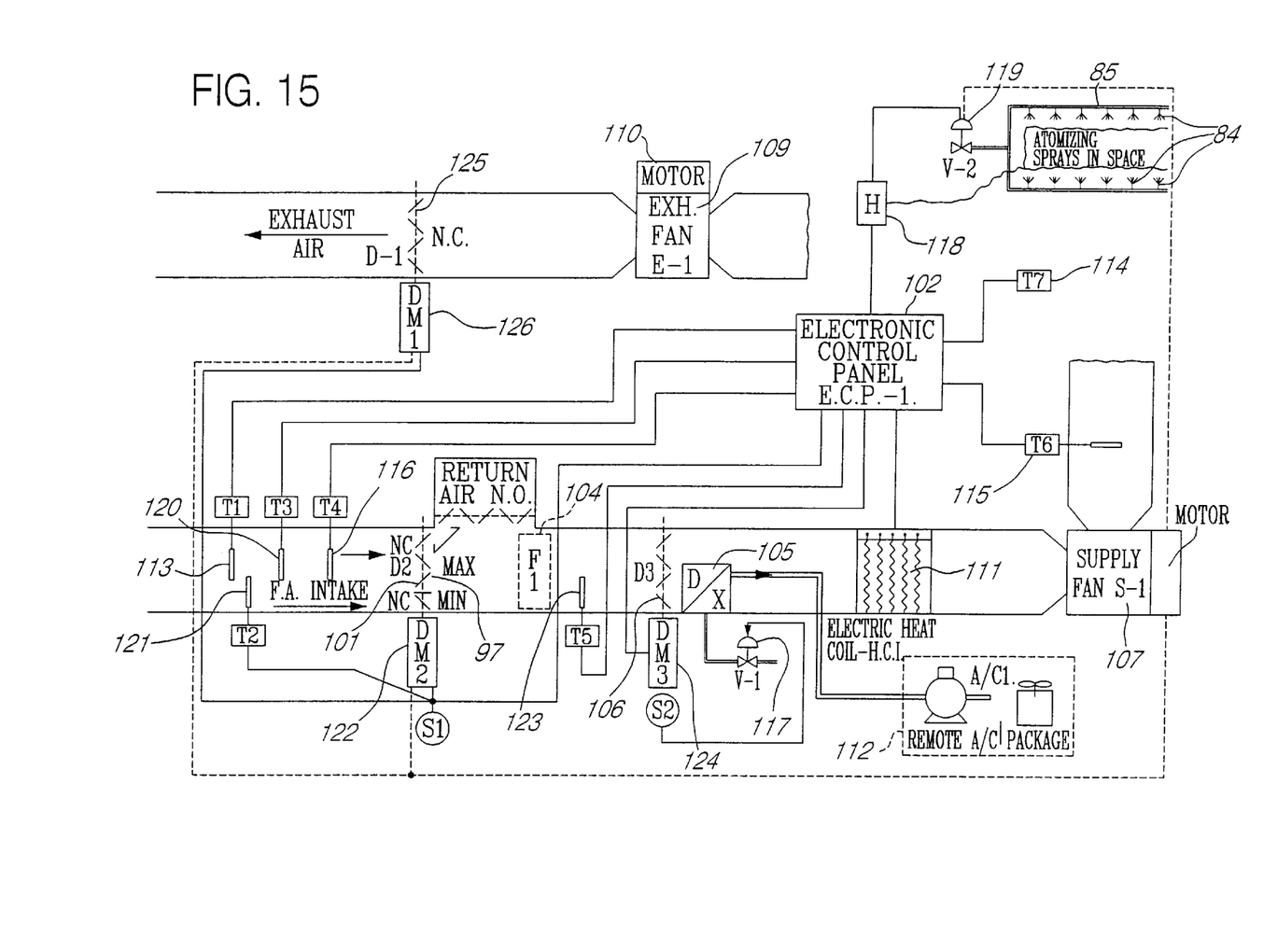
FIG. 15 is a block diagram showing the control circuit of the air handling and conditioning system.

The control compartment section 14 houses storage means in the form of two seed hoppers 17, which are fed seed from the top end thereof through a loading cylinder 18, coupled to an access door 19, secured to the roof 20 of the enclosure. The control compartment section 14 also houses a cold-water tank 21 and a hot-water tank 22, which are connected by suitable piping to various components of the system. A heater 23 is provided to heat the control compartment section 14 during cold climatic conditions outside the enclosure. The automatic air control system, as schematically illustrated in FIG. 15, is housed within the control panel 24. An electrical panel 25 is also provided in the control compartment section 14. An iodine unit 26 is also provided for mixing with water to feed the germination tank 27, which is located in the germinating and harvesting compartment section 15 to kill bacteria growth on the dry seeds.

Figure 1:
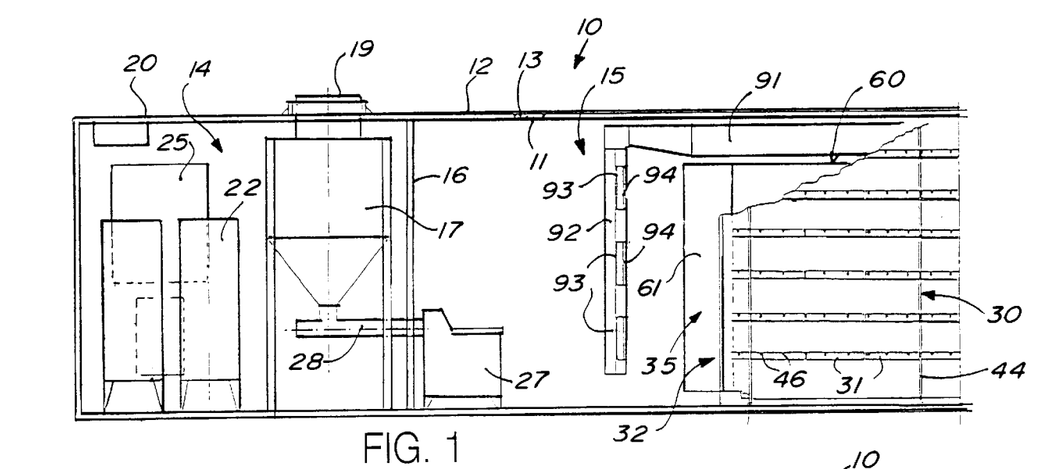
FIG. 1 is a simplified sectional side view through the insulated growing enclosure, showing the control compartment section and some of the main equipment housed therein and a portion of the growing and harvest compartment section.
Figure 2:
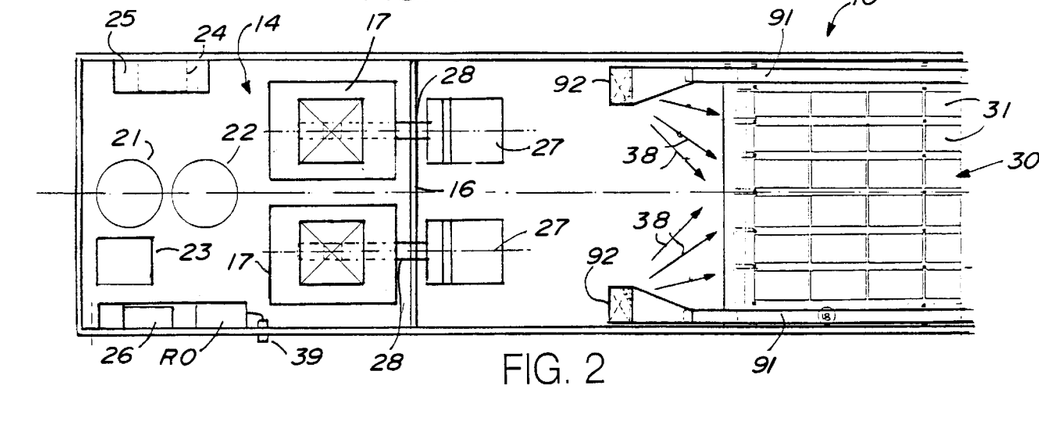
FIG. 2 is a top view of FIG. 1.

As herein shown, a hanger screw feed conveyor 28 feeds a predetermined quantity of seed grain from the hopper 17 into the germination tank 27, and this will be described later in detail. As shown in FIGS. 1 and 2, there are two hoppers 17, each associated with a respective one of two germination tanks 27. The germination tanks are isolated from the feed hoppers by the separating wall 15.

Figure 7:
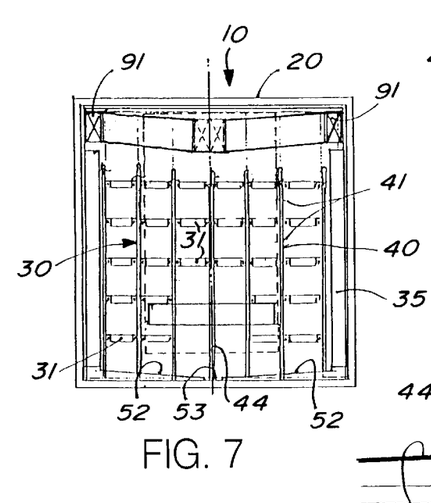
FIG. 7 is a section view through the racking system.
Figure 8:
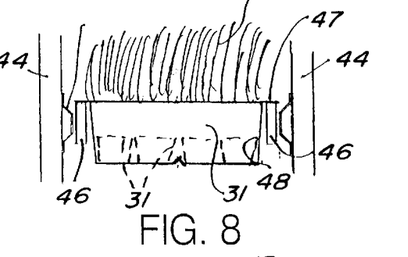
FIG. 8 is a further section view showing the trays that contain the germinating seed train and how they are supported on rollers.

The germination and harvest compartment section 15 houses a racking system 30 to support a plurality of grass germination trays 31, as better shown in FIGS. 7 and 8, and in which is disposed a predetermined quantity of germinating seed grain at an inlet end 32 of the racking system. These trays are supported in a horizontally spaced-apart fashion to constitute spaced-apart growing beds. The racking system has an outlet harvest end 33, as better illustrated in FIGS. 3 and 4, where the grass seeds have developed to the prerequisite grass size, as shown at G in FIG. 8. Access doors 34 are provided adjacent to this outlet harvest end to provide access to the racking system to unload a predetermined quantity of trays at this outlet end to provide feed grass for animals. These trays are emptied, rewashed and reused at the inlet end, where the germinating seeds are reloaded in each tray in a predetermined quantity. For a typical system as herein described, each tray is loaded with 7 pounds of germinating seed and after 7 days the outlet trays each have grown approximately 35 (thirty-five) pounds of barley grass.

Figure 10:
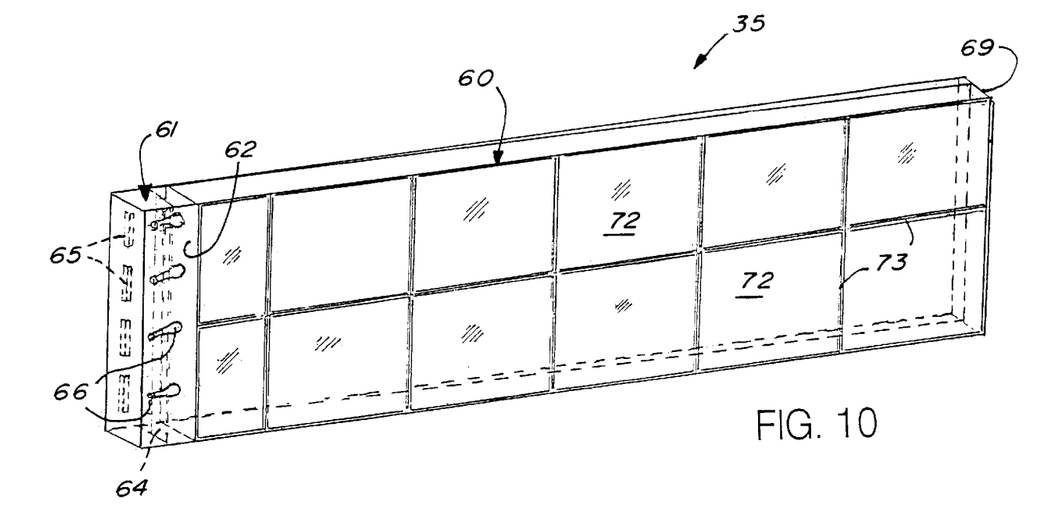
FIG. 10 is a perspective view illustrating the construction of the light wall units.

Light wall units 35, as better shown in FIG. 10, are secured on both sides of the racking system 30 and are dimensioned to provide light over all of the trays in the racking system.

An air handling and conditioning system 36, including an outside mixing box section 37, circulates a continuous conditioned and filtered air flow across all of the trays 31 supported in the racking system 30 from the inlet end 32 to the outlet harvest end 33. This air flow, as illustrated by flow lines 38, distributes carbon dioxide which is generated in a forward section of the inlet end 32 of the racking system by the germinating seeds, all across the trays in the racking system whereby to provide carbon dioxide over the entire growing beds. A water supply conduit means, such as that illustrated by reference numeral 39 in FIG. 2, connects pressurized water from an outside water supply source to feed various component parts of the system. Water conduits 40 are integrated with the racking system 30, as illustrated in FIG. 7, and are provided with atomizing jet nozzles 41 to spray a fine mist of water over the trays. A valve is automatically operated by the control panel and in accordance with a program function whereby to supply water under pressure to these nozzles on and off and for a predetermined time sequence, as dictated by the system and other variables. The seed may be one of barley, oats or corn seeds, or other seeds capable of being grown by the system as herein described. As also pointed out, the growing enclosure is constructed to operate under outside climatic conditions ranging from about −40° F. to at least +100° F.

As shown more clearly in FIGS. 7 and 8, it can be seen that the racking system is comprised of a plurality of vertical frame members 44 which are equidistantly spaced apart and immovably secured within the enclosure 10. Roller support members 45 are secured to the vertical frame members 44 and are inclined downward from the inlet end 32 of the racking system to the outlet harvest end 33 for gravity feed of the seed support trays 31, which are supported on rollers 46 secured to the support members 45. The trays 31 are provided with opposed side flanges 47 to sit on top of the rollers and they span at least two horizontally spaced rollers. The side walls 48 of the trays are also slightly tapered inwardly to clear the rollers 46. A suitable arresting mechanism 49, shown in FIG. 4, which is operated by a hand lever 50 or other means, is provided to arrest the trays 31' immediately at the outlet harvest end 33 of the racking system and to provide for their removal. As shown in FIG. 8, commercial sprout containers, such as plastic containers 51, containing germinating seeds may be housed in the support trays, but this is not essential.

Figure 3:
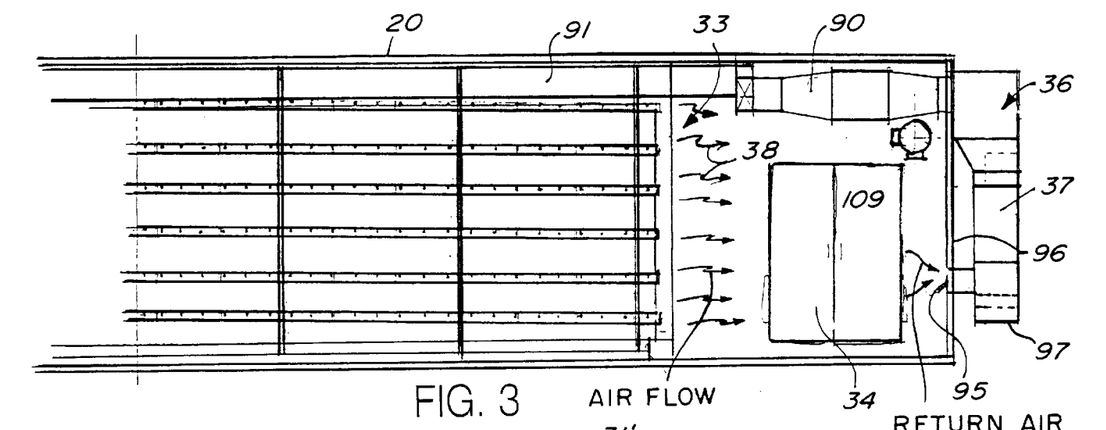
FIG. 3 is a sectional side view showing a further portion of the growing and harvest compartment and some of the equipment associated therewith.

FIG. 3 illustrates the downward slope of the beds of seed trays and conveniently this downward angle slopes from the inlet end to the outlet harvest end at a 5° angle. This provides for ease of displacement of the trays as they are pushed from the inlet end for reloading trays with germinating seeds from the germination tanks 27. Usually, two lateral rows of trays are discharged from the outlet harvest end on a daily basis. As the trays are pushed from the inlet end, two additional trays of germinating seeds are placed on the racking system and all of the trays are displaced by one day of growth. The trays are also fabricated from stainless steel.

Figure 9:
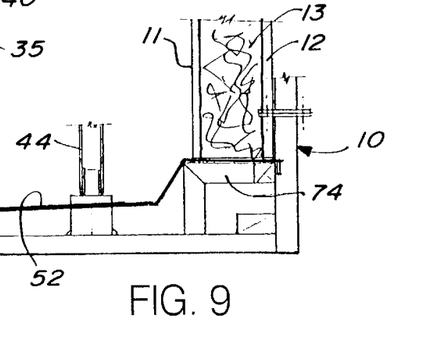
FIG. 9 is a corner section view of the bottom wall of the enclosure showing the inclined bottom wall under the racking system to channel water out of the growing and harvest compartments.

As shown in FIGS. 7 and 9, the racking system is secured over a drainage floor 52, which is inclined to channel water to a main discharge conduit 53 as water is sprayed over the beds by the jet spray nozzles 41. As previously described, there are two water tanks 21 and 22 in the control compartment section 14, one constituting a reservoir means for supplying pure temperature adjusted water for the irrigation of the beds, and the other to supply iodine-treated feed water to the germination tank 27 to kill bacteria.

Figures 11, 12:
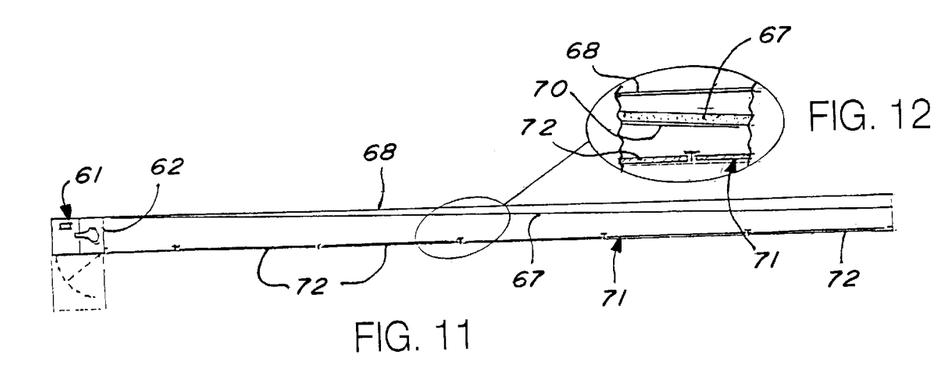
FIG. 11 is a top section view of the light wall unit.
FIG. 12 is an enlarged view of a section through the light wall unit showing the construction of the unit.

With reference now to FIGS. 10 to 12, there will be described the construction of the light-diffusing wall enclosures 35. As previously described, there are two such enclosures, one on each side and all along the racking system. Each of the light-diffusing wall enclosures 35 are constructed as a rectangular flat box structure 60. A light housing 61 is provided at one end of the box structure 60 all along a vertical end section 62 thereof. This light housing 61 is disposed, as shown in FIG. 1, forwardly of the inlet end 32 of the racking system for quick access thereto. Light sources 63 are secured on a vertical wall 64 of the light housing 61 all along the vertical end 62 of the box structure 60 to illuminate the inside of the box. Associated electrical components, such as ballasts 65, are also secured in this light housing 61. A sealed hinge door 66 provides access to the inside of the light housing for repair and maintenance.

Figure 13:
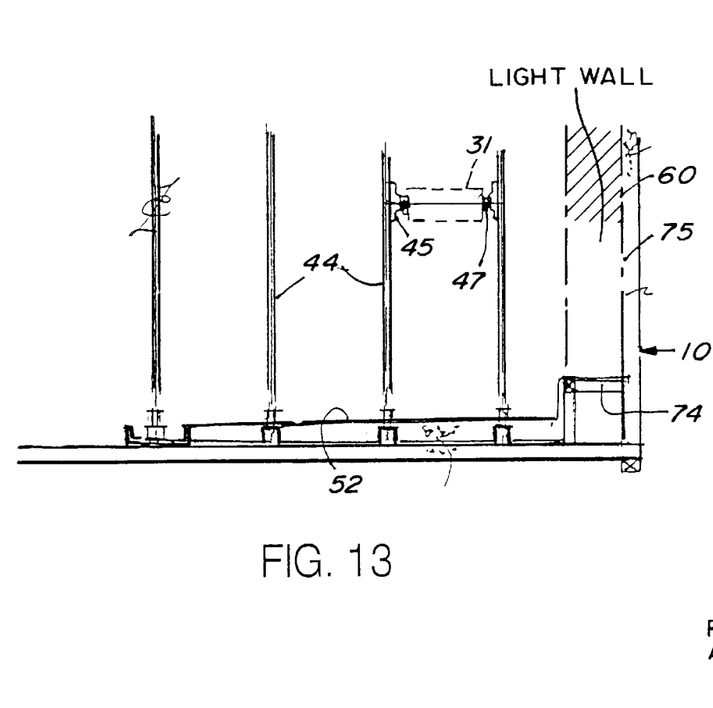
FIG. 13 is a fragmented transverse section view showing the position of the racking system relative to the light wall unit.

The box structure 60, as shown in FIGS. 11 and 12, is provided with an angled wall panel 67 spaced from a rear wall 68 of the flat box structure and inclined forwardly from the light housing 61 to the far end wall 69. A light-reflective material 70, such as a Mylar™ film, is secured to the front face of the wall panel 67. This Mylar™ film and the angled wall panel 67 provide for an even spectrum of light reflection through a light-diffusing front wall 71 of the housing 60. The light-diffusing front wall is constituted of a plurality of light-diffusing plastic panels 72, which are sealingly secured in a frame 73. As shown in FIG. 13, the light wall box structure 60 is mounted over a support ledge framework 74 provided along the side walls 75 of the enclosure 10. This provides for ease of mounting. They also support the panels for quick installation by few assembly workers.

Figure 16:
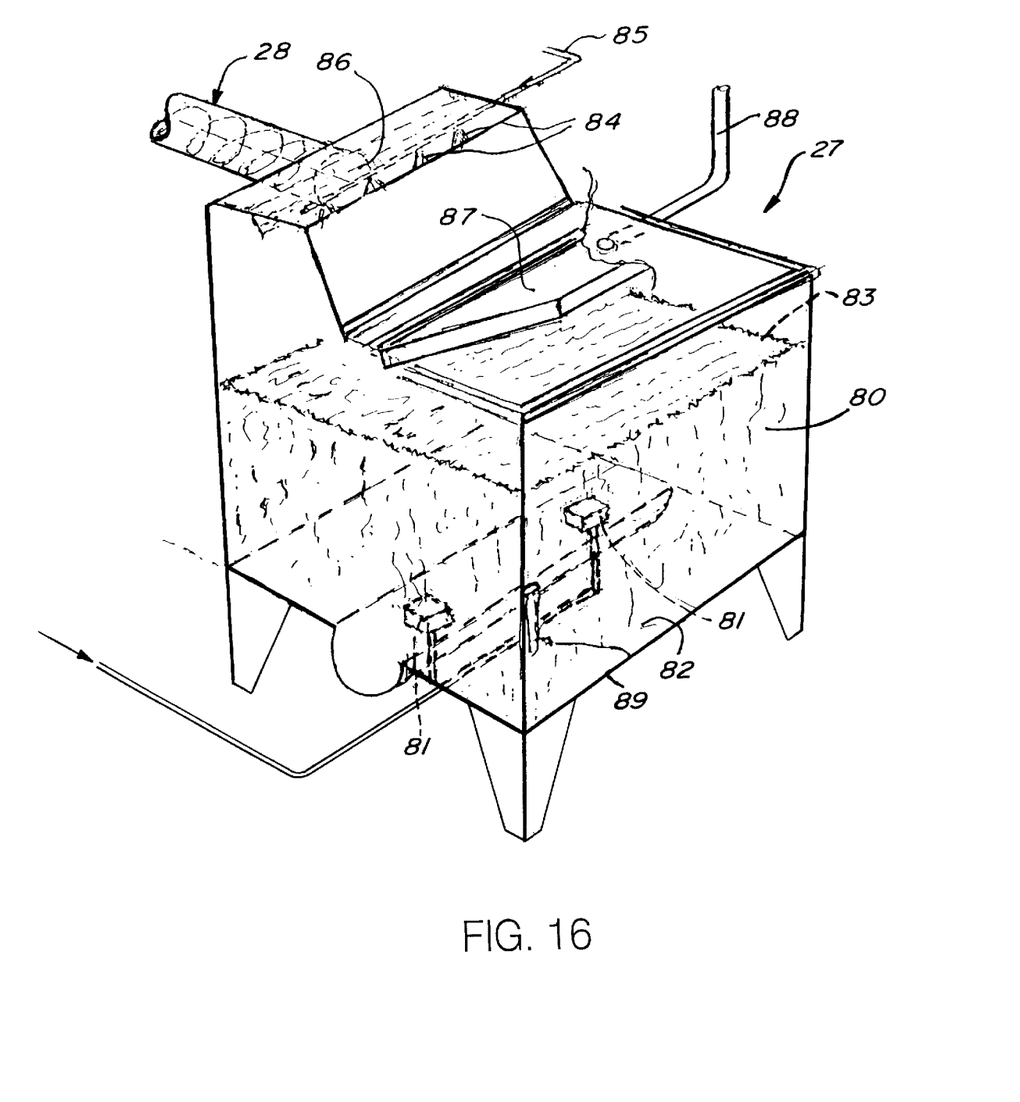
FIG. 16 is a perspective view showing the construction of the germination tank.

With reference now to FIG. 16, there is shown the construction of the germination tanks 27. As herein shown, each germination tank 27 is provided with a soak water holding reservoir 80, which is provided with aerators 81 extending from a bottom wall 82 thereof to supply air to the soak water 83 provided in the reservoir. The soak water is fed by spray nozzles 84 secured to a feed conduit 85 disposed above a discharge port 86 of the screw conveyor 28 to spray the seeds being discharged into the reservoir 80. The reservoir is further provided with a lid 87 and a vent conduit 88 to vent the area above the soak water 83 to atmosphere. Each of the germination tanks 27 is connected to a respective one of the two seed grain hoppers 17. A drain valve 89 is provided to drain the iodine soak water 83 from the reservoir prior to collecting the germinating seeds to load them on the trays. The seeds are held in the reservoir by a screen or other partitioning means. After the germination tank is emptied, the cycle repeats on a daily basis and, therefore, the seeds germinate within the soak water for a period of about 24 hours.

With reference now to FIGS. 1 to 4, 14 and 15, there will be described in more detail the construction and operation of the air handling and condition system. The system is a dual air ducting system which comprises a main conduit 90 and two supply air ducts 91. These supply air ducts 91 are secured adjacent to the top wall 20 of the growing enclosure 10 on the respective side of the racking system 30 adjacent to the side walls of the enclosure 10. A down comer duct 92 is secured to each of the supply air ducts 91 and dispose at a predetermined location forwardly of the inlet end of the racking system 30. The down comer duct has at least one, herein three air outlets 93 disposed therealong, and each provided with adjustable louvers 94 for adjusting the direction of pressurized air exiting the air outlets 93. A return air outlet 95 (see FIG. 3) is spaced rearwardly of the harvest end 33 of the racking system 30, whereby to direct the return air to a mixing box section 37 of the air handling and conditioning system located outside the enclosure 10 and secured thereto.

Figure 14:
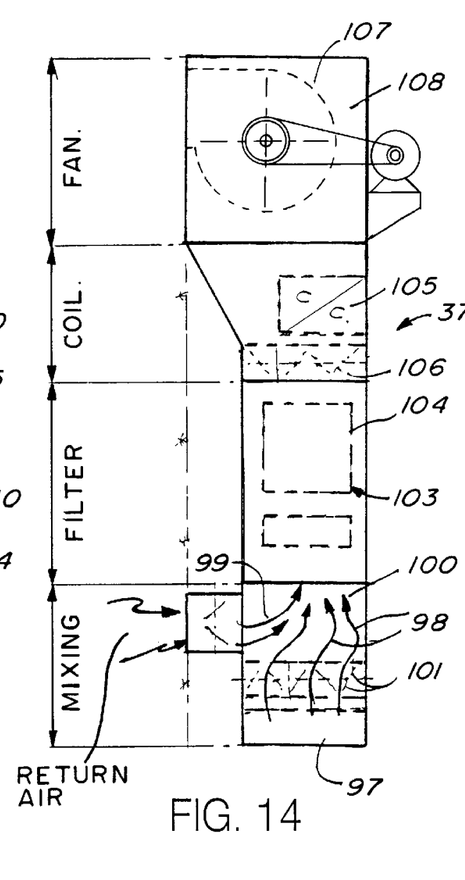
FIG. 14 is a simplified schematic view showing the construction of the mixing box section of the air convecting system.

With reference to FIG. 14, there is shown in more detail the construction of the mixing box section 37. As herein shown, the mixing box section is located outwardly of the enclosure 10 and secured to the rear wall 96 of the enclosure. Accordingly, the return air outlet 95 is provided with a hole made in this rear wall. The mixing box section 37 is provided with a fresh air inlet port 97 for mixing fresh air, as shown by the flow lines 98, with the return air as shown by the flow lines 99 in an inlet box 100 of the mixing box section. Adjustable louvers 101 are automatically controlled by the electronic control panel 102 of the control system, as illustrated in FIG. 15, whereby to regulate the amount of fresh air admitted in the inlet box for mixing with the return air, and this depends on various parameters, such as outdoor climatic conditions and indoor conditions of the return air.

Following the inlet mixing box 100, there is provided a filter section 103, which houses wet laid microfiberglass filter panels 104 and other type filters which are supported in stainless steel frames (now shown). A cooling coil section 105 is disposed at the outlet of the filter section and the air flow into the cooling coil section can also be regulated by adjustable louvers 106, also controlled by the control panel 102. These cooling coils are regulated by the electronic control panel, depending on climatic conditions and the temperature inside the enclosure 10. A fan 107, mounted in a fan housing 108 at the end of mixing box section 37, circulates the air and feeds this conditioned air to the main conduit 90. An outside exhaust air fan assembly 109 is also provided in a wall on the enclosure and disposed rearwardly toward the harvest end of the racking system to exhaust return air to atmosphere and in predetermined quantities as regulated by the electronic control panel. The outside exhaust air fan is controlled by a programmed function forming part of the electronic control panel 102 which controls the motor 110 of the exhaust air fan system, as illustrated in FIG. 15.

Figure 4:
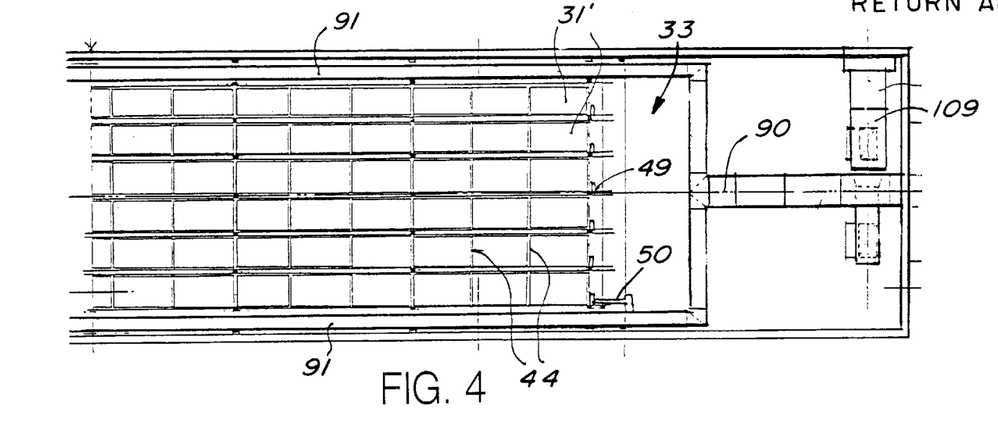
FIG. 4 is a top view of FIG. 3.
Figure 5:
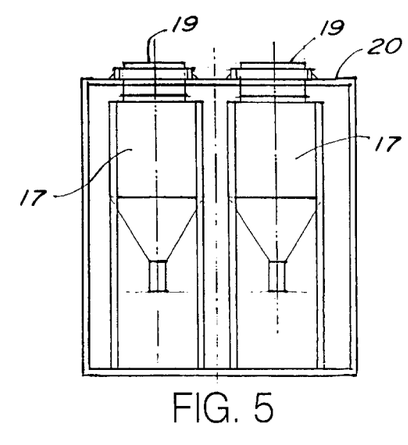
FIG. 5 is a further section view through the control compartment showing the two hoppers.
Figure 6:
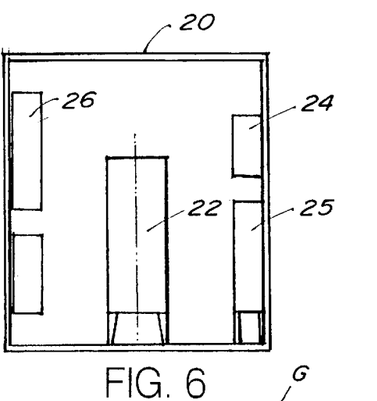
FIG. 6 is a section view through the control compartment section.

As shown in FIGS. 15, 3 and 4, an electric heating coil is inserted in the main duct and provides a heating unit for the return air from the mixing box section 36, whereby to condition the temperature of the return air fed to the two supply air ducts. The electric heating coil unit 111 is also controlled by the electronic control panel 102 and, as illustrated in FIG. 15, this electric heating coil assembly 111 can be mounted in the mixing box section 37.

With reference to FIG. 15, there is shown in schematic block diagram the integrated interior climatic control system for the hydroponic production of animal feed grass, such as barley grass. This control system incorporates an air conditioning package 112 capable of operation with seasonal outside temperature variations from −40° F. (−40° C.) to at least +100° F. (+37° C.). The minimum fresh air intake through the intake 97 is 25% of the system total air supply quantity at all times during the year. The outside air compensates the system on a year-round basis and maximum economy is achieved by using more than minimum outdoor air for atmospheric cooling when outside conditions permit, i.e., during marginal or in-between seasonal conditions. When the air handling and conditioning system is energized, the supply fan 107 and exhaust fan 109 start operating. A changeover thermostat 113 selects either the summer or winter compensation mode according to outdoor temperature. At no-load condition, this schedule will change over automatically. On the winter compensation schedule, the electronic control panel 102 controls the space temperature by coordinating signals from the internal space thermostat 114, discharge thermostat 115 and an outdoor thermostat 116. The electric heating coil 111 is also provided with a step controller (not shown) whereby to sequence the electric heating coils depending on air temperature requirements. Outdoor and return air louvers 101 are also controlled. The cooling coils 105 are controlled by a valve 117, depending on space temperature requirements.

It is pointed out that the outside air thermostat 116 is adjustable either to overcome system offset or elevate the space temperature within the enclosure as the outside temperature falls. The electronic control panel 102 programs signals from the humidistat 118 to control humidification levels in the space by eyeling atomizing spray valve 119 which is connected to the spray nozzles 84 of the feed conduit 85.

In the summer compensation mode, the electronic panel 102 controls the space temperature by coordinating signals from the space thermostat 114 and outdoor thermostat 120 to operate the cooling valve 117 and cooling coil bypass dampers 106 for cooling the outdoor and return air for ventilating or electric heating element sequencing for heating depending on interior space temperature. The outdoor air thermostat 120 causes the space temperature to elevate as the outside air temperature rises. When the outside air is too warm, outside air thermostat 121 will return the outdoor air damper 101 to its minimum position (as established by a minimum position switch 122) to eliminate outside excess fresh air and provide economical operation of the refrigeration equipment 112, 115.

Under normal operation, the outdoor air damper motor 122 positions the dampers at their minimum position except when outside air is used for atmospheric cooling. A thermostat 123 provides signals concerning the return air temperature in the mixing box section 37. The motor 124 controls the dampers 106, and these dampers are adjusted so that they do not completely close whereby to prevent the cooling coils 105 from frosting the dampers. As herein shown, the exhaust air is also controlled by dampers 125, which are controlled by a motor 126, which connects to the electronic control panel. Although not shown, the electronic control panel is a fully automated, computer-controlled panel and with its sensor system is capable of operating the air conditioning system fully automatically. The electronic control panel can also be integrated in a CPU unit (not shown, but obvious to a person skilled in the art) whereby all working aspects of the hydroponic growing system are fully integrated. The CPU can also provide for system monitoring and adjustments through a computer located elsewhere.

Other aspects of the hydroponic growing system of the present invention will now be described. It is pointed out that the water holding tanks are capable of supplying pure temperature-adjusted water directly to the header pipe for irrigation of the multi-layered growing beds or through an iodine treatment device for feed water to the germination tanks. The hoppers 17 are designed for manual loading through the roof-mounted, explosion-proof access door 19, and these hoppers are designed to hold a 14-day seed supply. They are also equipped with a universal pipe fitting (not shown) for connection to a standard grain silo conveyor. Although not shown, the germination tank aerators 81 are fed with filtered air from an air filtering system. These tanks are fabricated from stainless steel and are floor-mounted with full throat-sealed and hinged top lids. The tanks are also designed for easy washdown and bottom draining.

The light wall housings are also sealed housings, as described above. The first quarter section of the light wall reflective surface is also preferable coated with an extra film so that the wall delivers a red spectrum of light to the early growing grass in the trays at the inlet end of the racking system.

The air conditioning ducting is constructed of stainless steel and delivers a constant air flow substantially evenly across each layer of the multi-layered growing beds positioned in the racking system.

The hydroponic growing system of the present invention was designed to produce grasses which are free from impurities and the various apparatuses used were designed for low maintenance and minimum operational manpower. The enclosure was designed as a freestanding modular shell, the sections of which are manufactured as composite panels, each with a stainless-steel inner skin backed by a low-profile stainless-steel superstructure and designed to be bolted from the inside. Stainless-steel conduits and equipment hangers are factory-welded and fitted. Each shell panel section is specifically tin-wall insulated for operational temperatures from −40° C. to +40° C. The superstructure forms a ribbing which ties into the racking upright which supports the racking system. The superstructure also supports the external air handling unit at one end of the assembled shell, and is assembled at the other end to externally support the system operational equipment. More specifically, the shell and operating equipment have an 8×50 foot layout and is designed to be mounted on a 2-foot high platform for access to drainage tanks. An outer shell can be hung on the superstructure to conform to any architectural preference, and is also designed for ease of assembly on a standard 53-foot North American road trailer package.

The assembly is a simple connection of structural and operating equipment modules. The system can be field-serviced by modular replacement section or transported, in the trailer version, for relocation or factory refitting.

The unit is also designed to quick-connect to a standard low-pressure water source and draw a maximum of 1,000 liters per day through the unit's multi-stage ceramic reverse-osmosis filtration system R.O. (see FIG. 2), which is obvious to a person skilled in the art. Two hundred liters of water daily are consumed by the growing chamber, leaving up to 800 liters for an excellent feed water supply. The system housing and piping are all stainless steel with a valve exterior drain and supply line. The iodine-producing unit meters 3 parts per million of iodine into the water from an iodine cartridge. The iodine replaces the use of chlorine in the germination cycle, effectively eliminating bacteria brought into the system on the dry barley seed.

The unit can be set to operate from standard power lines depending on site conditions. Ideal conditions would be a 220/110 volt service with back-up diesel generation on site. The main control panel located in the control room houses a set programmed chip which uses a sensor network to relay information to modular programmable controls located in the germination room. These controllers can manually override any of the operating systems or be reset to auto pilot.

The main control panel is equipped with communication ports for site and remote data downloading.

The inside of the chamber is designed to be airtight with smooth contours. The floor is in three sections forming three distinct shallow basins—one for each of the germination, growing and harvest rooms, each separated by a step without walls. The two entrance doors into the chamber are located in the germination and harvest ends of the chamber.

Concerning the germination tank, it is also pointed out that, by using a unique floating-bed aeration technology, these tanks are able to sprout 95% to 97% of feed-quality barley seed in a 24-hour cycle. The units are constructed in low-carbon stainless steel and stand alone with their own supply lines, air pumps and controls for independent operation.

It is within the ambit of the present invention to cover any obvious modifications of the example of the preferred embodiment described herein, provided such modifications fall within the scope of the appended claims.

What is claimed is:

1. A self-contained hydroponic growing enclosure for the fabrication of animal feed grass from seed and independent of outside climatic conditions, said growing enclosure comprising a seed grain storage means located in a control compartment section of said enclosure and isolated from a growing and harvest compartment section, conveyor means to supply seed from said storage means to a germination tank located in said growing and harvest compartment, said germination tank having bacteria-suppressing means, a racking system in said growing and harvest compartment to support a plurality of trays of germinating seed grain and growing grasses in horizontally spaced-apart growing beds, said racking system having an inlet end where said grass seeds are germinating and an outlet harvest end where said grass seeds have developed to the prerequisite grass size, light wall units on opposed sides of said racking system and dimensioned to provide light over all of said beds, and air handling and conditioning system having directional air outlet means for circulating a continuous conditioned and filtered air flow across all of said trays in said racking system from said inlet end; said air flow distributing carbon dioxide, generated in a section of said inlet end by said germinating seed grain, over said entire growing beds; water supply conduit means associated with said enclosure to connect with a pressurized water supply source, spray means to spray water over said beds, said light wall units each having a light-diffusing wall enclosure provided with light-reflecting means and an independent light housing for housing light sources and associated electrical parts, said light-reflecting means providing substantially uniform light radiation along said racking system and over said beds, water treatment system, reservoir means for supplying pure temperature-adjusted water for irrigation of said beds, said reservoir means also supplying iodine-treated feed water to said germination tank to kill any bacteria growth on said seeds, there being two of said germination tanks, each said germination tank being connected to a respective one of two seed grain hoppers constituting said seed grain storage means, a screw conveyor constituting said conveyor means interconnecting a germination tank to a respective one of said seed grain hoppers to load a predetermined quantity of seeds in said germination tank, said germination tanks being provided with a soak water holding reservoir provided with aerators to supply air to soak water in said reservoir, said iodine-treated feed water being supplied to said reservoir by spray nozzles, said spray nozzles being disposed above a discharge port of said screw conveyor to spray said seeds as they are discharged in said reservoir, said reservoir having a lid and a vent conduit to vent the area above said soak water to atmosphere.

2. A self-contained hydroponic growing enclosure as claimed in claim 1 wherein said enclosure is an insulated stainless-steel enclosure for outdoor use and continuous operation under outside climatic conditions ranging from about −40° F. to at least +100° F.

3. A self-contained hydroponic growing enclosure as claimed in claim 1 wherein said seed is one of barley, oats and corn seeds.

4. A self-contained hydroponic growing enclosure as claimed in claim 1 wherein said racking system comprises a plurality of vertical frame members equidistantly spaced apart, roller support members secured to said vertical frame members for securing tray support rollers, said roller support members being inclined downward from said inlet end to said outlet harvest end for gravity feed of seed support trays supported on said rollers.

5. A self-contained hydroponic growing enclosure as claimed in claim 4 wherein commercial sprout containers containing said germinating seeds are housed in said support trays.

6. A self-contained hydroponic growing enclosure as claimed in claim 4 wherein said racking system is secured over a drainage floor which is inclined to channel water out from under said racking system.

7. A self-contained hydroponic growing enclosure as claimed in claim 1 wherein said light-diffusing wall enclosures are each comprised of a rectangular flat box structure, said light housing being a waterproof housing disposed along a vertical end wall thereof, an angled wall panel spaced from a rear wall of said flat box structure and inclined forwardly from said light housing, a light-reflective material disposed on a front face of said wall panel, said flat box structure having a light-diffusing front wall to provide an even spectrum of light to said beds.

8. A self-contained hydroponic growing enclosure as claimed in claim 7 wherein said light-reflective material is a polyester film secured to said front face of said wall panel, said light-diffusing front wall being constituted by light-diffusing plastic panels, said light housing being disposed forwardly by said front end of said racking system, a front section of said wall panel having infra-red light reflected therefrom.

9. A self-contained hydroponic growing enclosure as claimed in claim 1 wherein said air handling and conditioning system comprises a pair of supply air ducts, each supply air duct of said pair being disposed adjacent to a top wall of said growing enclosure on a respective side of said racking system, a down comer duct secured to said supply air duct and disposed at a predetermined location forwardly of said inlet end of said racking system, said down comer duct having at least one air outlet provided with adjustable louvers for adjusting the direction of pressurized air exiting said air outlet, and a return air outlet spaced rearwardly of said harvest end of said racking system for conditioning and recirculating said return air.

10. A self-contained hydroponic growing enclosure as claimed in claim 9 wherein said return air outlet is in a rear wall of said growing enclosure and connects into an outside air conditioning and mixing box section, said air conditioning mixing box section having a fresh air inlet port provided with adjustable louvers to control the quantity of fresh air for mixing with return air from said growing beads, a filter section for filtering airborne bacteria from said return air, a cooling coil section to control the temperature of said filtered air, and a fan to circulate said return air through said supply air ducts and said mixing box section.

11. A self-contained hydroponic growing enclosure as claimed in claim 9 wherein there is further provided an outside exhaust air fan rearwardly of said harvest end of said racking system and control means to regulate the volume of exhausted air.

12. A self-contained hydroponic growing enclosure as claimed in claim 9 wherein there is further provided a heating unit disposed in a main conduit of said air returned from said mixing box section whereby to condition the temperature of said air fed to said pair of supply air ducts.

13. A self-contained hydroponic growing enclosure as claimed in claim 9 wherein said spray means is comprised of a network of spray nozzles associated with said racking system to spray atomized water over said grass-growing beds, and control means to control the time and sequence of said water spray.

14. A self-contained hydroponic growing enclosure as claimed in claim 9 wherein said air handling and conditioning system is a computer control system having a controller, a plurality of thermostat-feeding temperature signals to said control, said controller feeding control signals to louver positioning motors and temperature control devices to regulate said air flow through said beds.

15. A self-contained hydroponic growing enclosure for the fabrication of animal feed grass from seed and independent of outside climatic conditions, said growing enclosure comprising a seed grain storage means located in a control compartment section of said enclosure and isolated from a growing and harvest compartment section, conveyor means to supply seed from said storage means to a germination tank located in said growing and harvest compartment, said germination tank having bacteria-suppressing means, a racking system in said growing and harvest compartment to support a plurality of trays of germinating seed grain and growing grasses in horizontally spaced-apart growing beds, said racking system having an inlet end where said grass seeds are germinating and an outlet harvest end where said grass seeds have developed to the prerequisite grass size, light wall units on opposed sides of said racking system and dimensioned to provide light over all of said beds, and air handling and conditioning system having directional air outlet means for circulating a continuous conditioned and filtered air flow across all of said trays in said racking system from said inlet end; said air flow distributing carbon dioxide, generated in a section of said inlet end by said germinating seed grain, over said entire growing beds; water supply conduit means associated with said enclosure to connect with a pressurized water supply source, spray means to spray water over said beds, said light wall units each having a light-diffusing wall enclosure provided with light-reflecting means and an independent light housing for housing light sources and associated electrical parts, said light-reflecting means providing substantially uniform light radiation along said racking system and over said beds, said air handling and conditioning system having a pair of supply air ducts, each supply air duct of said pair being disposed adjacent to a top wall of said growing enclosure on a respective side of said racking system, a down comer duct secured to said supply air duct and disposed at a predetermined location forwardly of said inlet end of said racking system, said down comer duct having at least one air outlet provided with adjustable louvers for adjusting the direction of pressurized air exiting said air outlet, and a return air outlet spaced rearwardly of said harvest end of said racking system for conditioning and recirculating said return air.

16. A self-contained hydroponic growing enclosure as claimed in claim 15 wherein said return air outlet is in a rear wall of said growing enclosure and connects into an outside air conditioning and mixing box section, said air conditioning mixing box section having a fresh air inlet port provided with adjustable louvers to control the quantity of fresh air for mixing with return air from said growing beads, a filter section for filtering airborne bacteria from said return air, a cooling coil section to control the temperature of said filtered air, and a fan to circulate said return air through said supply air ducts and said mixing box section.

17. A self-contained hydroponic growing enclosure as claimed in claim 15 wherein there is further provided an outside exhaust air fan rearwardly of said harvest end of said racking system and control means to regulate the volume of exhausted air.

18. A self-contained hydroponic growing enclosure as claimed in claim 15 wherein there is further provided a heating unit disposed in a main conduit of said air returned from said mixing box section whereby to condition the temperature of said air fed to said pair of supply air ducts.

19. A self-contained hydroponic growing enclosure as claimed in claim 15 wherein said spray means is comprised of a network of spray nozzles associated with said racking system to spray atomized water over said grass-growing beds, and control means to control the time and sequence of said water spray.

20. A self-contained hydroponic growing enclosure as claimed in claim 15 wherein said air handling and conditioning system is a computer control system having a controller, a plurality of thermostat-feeding temperature signals to said control, said controller feeding control signals to louver positioning motors and temperature control devices to regulate said air flow through said beds.

* * * * *